United States Patent
Zheng et al.

(10) Patent No.: US 10,574,353 B2
(45) Date of Patent: Feb. 25, 2020

(54) SIGNAL PROCESSING APPARATUS, OPTICAL LINE TERMINAL, AND COMMUNICATIONS SYSTEM

(71) Applicant: Huawei Technologies Co., Ltd., Shenzhen (CN)

(72) Inventors: Jianyu Zheng, Wuhan (CN); Shengping Li, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,491

(22) Filed: Mar. 28, 2019

(65) Prior Publication Data

US 2019/0222313 A1 Jul. 18, 2019

Related U.S. Application Data

(63) Continuation of application No. PCT/CN2016/101074, filed on Sep. 30, 2016.

(51) Int. Cl.
*H04B 10/00* (2013.01)
*H04B 10/079* (2013.01)
*H04B 17/10* (2015.01)
*H04B 17/21* (2015.01)

(52) U.S. Cl.
CPC ... *H04B 10/07955* (2013.01); *H04B 10/0797* (2013.01); *H04B 17/104* (2015.01); *H04B 17/21* (2015.01)

(58) Field of Classification Search
USPC .................................................. 398/66–73
See application file for complete search history.

(56) References Cited

U.S. PATENT DOCUMENTS

| | | | |
|---|---|---|---|
| 5,412,498 A | * | 5/1995 | Arstein .......... H03K 5/084 370/436 |
| 5,430,765 A | | 7/1995 | Nagahori |
| 5,617,060 A | | 4/1997 | Wilson et al. |

(Continued)

FOREIGN PATENT DOCUMENTS

| | | |
|---|---|---|
| CN | 101217310 A | 7/2008 |
| CN | 101335571 A | 12/2008 |

(Continued)

*Primary Examiner* — Agustin Bello
(74) *Attorney, Agent, or Firm* — Leydig, Voit & Mayer, Ltd.

(57) ABSTRACT

A signal processing apparatus, an optical line terminal, and a communications system are provided. The signal processing apparatus includes a signal input interface, a signal output interface, a reset signal generation unit, a signal amplification and equalization unit, an enable signal generation unit, and N direct-current offset calibration loop units. The signal input interface is connected to the signal amplification and equalization unit, which is connected to the signal output interface and the enable signal generation unit; the enable signal generation unit is connected to the N direct-current offset calibration loop units, which are connected to the signal amplification and equalization unit; and the reset signal generation unit is connected to the N direct-current offset calibration loop units. Embodiments of the present invention are directed to reduce an LA burst settling time, thereby reducing physical overheads of a link.

20 Claims, 2 Drawing Sheets

(56) References Cited

U.S. PATENT DOCUMENTS

| | | | |
|---|---|---|---|
| 6,784,749 B1 | 8/2004 | Cove | |
| 7,477,885 B2 | 1/2009 | Rostami et al. | |
| 7,795,960 B2 | 9/2010 | Lyden et al. | |
| 7,902,900 B2 | 3/2011 | Liu et al. | |
| 8,380,079 B2 | 2/2013 | Melange et al. | |
| 8,433,206 B2 | 4/2013 | Kim et al. | |
| 9,716,556 B2 * | 7/2017 | Sakuramoto | H04B 10/6933 |
| 2004/0251403 A1 * | 12/2004 | Park | H04B 10/6931 |
| | | | 250/221 |
| 2006/0251429 A1 * | 11/2006 | Yi | H04B 10/66 |
| | | | 398/209 |
| 2009/0103932 A1 * | 4/2009 | Yi | H04B 10/66 |
| | | | 398/209 |
| 2011/0129235 A1 | 6/2011 | Le et al. | |
| 2015/0117863 A1 * | 4/2015 | Sakuramoto | H04B 10/6933 |
| | | | 398/116 |
| 2019/0222313 A1 * | 7/2019 | Zheng | H04B 10/07955 |

FOREIGN PATENT DOCUMENTS

| | | |
|---|---|---|
| CN | 101527599 A | 9/2009 |
| CN | 102124669 A | 7/2011 |
| CN | 102347794 A | 2/2012 |
| CN | 102386857 A | 3/2012 |
| CN | 202177841 U | 3/2012 |
| CN | 103095369 A | 5/2013 |
| CN | 103178905 A | 6/2013 |
| CN | 104618052 A | 5/2015 |
| EP | 1355437 A1 | 10/2003 |
| EP | 1357685 A2 | 10/2003 |
| EP | 2213021 B1 | 8/2010 |

\* cited by examiner

SIGNAL PROCESSING APPARATUS, OPTICAL LINE TERMINAL, AND COMMUNICATIONS SYSTEM

CROSS-REFERENCE TO RELATED APPLICATIONS

This application is a continuation of International Application No. PCT/CN2016/101074, filed on Sep. 30, 2016, the disclosure of which is hereby incorporated by reference in its entirety.

TECHNICAL FIELD

Embodiments of the present invention relate to the communications field, and in particular, to a signal processing apparatus, an optical line terminal, and a communications system in the communications field.

BACKGROUND

As communications technologies develop, users have increasingly high requirements on uplink communication rates in communications networks. For example, a global mobile upload throughput reached 6860 gigabytes in 2014, and it is expected that by 2019, the uplink throughput is to reach 60000 gigabytes.

As can be learned, it has been difficult for an asymmetric low-rate uplink speed to meet a market requirement. This provides a broad application scenario for a next generation passive optical network (PON) with a high symmetric transmission rate, but also causes a series of technical problems.

In the PON, especially in a case of a high uplink rate, additional uplink overheads are caused if a burst settling time of a compression limiting amplifier (LA) in an optical line terminal (OLT) is extremely long. Therefore, how to reduce the burst settling time of the limiting amplifier (LA) as much as possible is a problem that urgently needs to be resolved.

SUMMARY

The present invention provides a signal processing apparatus, an optical line terminal, and a communications system, to reduce an LA burst settling time, thereby reducing physical overheads of a link.

According to a first aspect, the present invention provides a signal processing apparatus, including: a signal input interface, a signal output interface, a reset signal generation unit, a signal amplification and equalization unit, an enable signal generation unit, and N direct-current offset calibration loop units, where N is a positive integer; the signal input interface is connected to the signal amplification and equalization unit, the signal amplification and equalization unit is connected to the signal output interface and the enable signal generation unit, the enable signal generation unit is connected to the N direct-current offset calibration loop units, the N direct-current offset calibration loop units are connected to the signal amplification and equalization unit, and the reset signal generation unit is connected to the N direct-current offset calibration loop units; the signal input interface is configured to receive a first signal; the reset signal generation unit is configured to output a reset signal to the N direct-current offset calibration loop units when an interval time occurs in a data burst block in the first signal; the signal amplification and equalization unit is configured to: adjust, based on a second signal output by the N direct-current offset calibration loop units, the first signal received from the signal input interface, and amplify and equalize the first signal; the enable signal generation unit is configured to: detect a differential voltage corresponding to a signal output by the signal amplification and equalization unit, and output an enable signal to the N direct-current offset calibration loop units based on the differential voltage; the N direct-current offset calibration loop units are configured to: perform resetting when receiving the reset signal output by the reset signal generation unit, and when receiving the enable signal output by the enable signal generation unit, start to output the second signal to the signal amplification and equalization unit based on a clock signal; and the signal output interface is configured to output the output signal adjusted, amplified, and equalized by the amplification and equalization unit.

Compared with the prior art, the signal processing apparatus adjusts a direct-current offset in the interval time of the data burst block in the input signal, and may complete the adjustment of the direct-current offset within the interval time, instead of starting to adjust the direct current offset only when the signal carries data, so that the direct-current offset can be adjusted in advance, and a time for adjusting the direct-current offset can be finally reduced, thereby improving bandwidth utilization.

In a possible implementation, the enable signal generation unit is further configured to output the clock signal to the N direct-current offset calibration loop units based on the enable signal.

In a possible implementation, the reset signal generation unit includes a signal detector and a reset signal generator that are sequentially connected, where the signal detector is configured to output an indication signal to the reset signal generator when detecting that an interval time occurs in the data burst block in the first signal; and the reset signal generator is configured to output the reset signal to the N direct-current offset calibration loop units when receiving the indication signal output by the signal detector.

The reset signal generation unit of the signal processing apparatus may detect the interval time in the first signal, to be specific, detect whether there is data transmitted in the first signal, so that the reset signal generation unit can output a reset signal to another unit more quickly, thereby further reducing the time for adjusting the direct-current offset.

Optionally, the reset signal unit may be configured to: receive an instruction sent by a MAC chip, and output the reset signal according to the instruction.

Optionally, the reset signal unit may include the signal detector that is configured to detect the interval time of the data burst block in the first signal, and may further be configured to receive an indication signal that is sent by a MAC chip and that is used to instruct a reset signal transmitter to output the reset signal. In this way, when the time interval for detection by the signal detector of the reset signal unit is insufficient to complete the adjustment of the direct-current offset, the instruction of the MAC chip can be received to complete the adjustment of the direct-current offset.

In a possible implementation, the signal amplification and equalization unit includes N signal adders, at least one limiting amplifier LA, M continuous time linear equalizers CTLEs, and K low frequency equalizers LFEQs, where M and K are positive integers; each signal adder is configured to add the first signal and the second signal; the at least one LA is configured to amplify a signal in the amplification and equalization unit; and the at least one CTLE and the at least one LFEQ are configured to equalize the signal in the amplification and equalization unit.

In a possible implementation, each of the N direct-current offset calibration loop units includes a counter, a digital-to-analog converter DAC, and a voltage controlled mirror current source sequentially connected to each other, where each counter is configured to zero out when receiving the reset signal, and each DAC is configured to output a reference voltage minimum value when receiving the reset signal.

In a possible implementation, the enable signal generation unit includes a voltage detector, an enable signal generator, and a clock controller, where the voltage detector is configured to detect the differential voltage corresponding to the signal output by the amplification unit; the enable signal generator is configured to output the enable signal to the N direct-current offset calibration loop units based on the differential voltage detected by the voltage detector; the clock controller is configured to: process an original clock signal based on the enable signal output by the enable signal generator, and output the processed clock signal to the N direct-current offset calibration loop units; each direct-current offset calibration loop unit is further configured to: when receiving the enable signal output by the enable signal generation unit, output the second signal based on the clock signal output by the clock controller; each DAC is further configured to output a voltage based on a counting result output by a corresponding counter; each voltage controlled mirror current source is configured to output the second signal based on a voltage output by a corresponding DAC and a reference voltage medium value of the corresponding DAC; and the clock controller is further configured to: when the voltage detector detects that the bias voltage inverses for an $(N+1)^{th}$ time, stop, based on the enable signal output by the enable signal generator, outputting the clock signal to the N counters.

In the signal processing apparatus, the clock controller included in the enable signal generation unit may output the clock signal to the direct-current offset calibration loop unit based on an inverse status of the differential voltage of the first signal.

In a possible implementation, N=2, M=2, and K=1, where the M CTLEs, the K LFEQs, and the at least one LA are sequentially interleaved; a first direct-current offset calibration loop unit of the N direct-current offset calibration loop units is connected to the first signal adder; a DAC in the first direct-current offset calibration loop unit of the N direct-current offset calibration loop units is connected to a first input port of two input ports in a voltage controlled mirror current source in the first direct-current offset calibration loop unit, and a DAC in a second direct-current offset calibration loop unit of the N direct-current offset calibration loop units is connected to a second input port of two input ports in a voltage controlled mirror current source in the second direct-current offset calibration loop unit; the clock controller includes an AND gate and an OR gate; the enable signal generator is connected to the AND gate, and the AND gate is configured to perform an AND logical operation on the enable signal output by the enable signal generator; the AND gate is connected to the OR gate, and the OR gate is configured to perform an OR logical operation on a signal output by the AND gate and the original clock signal, to obtain the clock signal; and the OR gate is connected to the N counters.

According to a second aspect, the present invention provides an optical line terminal, including the signal processing apparatus according to any one of the first aspect or the possible implementations of the first aspect.

The optical line terminal adjusts a direct-current offset in the interval time of the data burst block in the input signal, and may complete the adjustment of the direct-current offset within the interval time, instead of starting to adjust the direct current offset only when the signal carries data, so that the direct-current offset can be adjusted in advance, and a time for adjusting the direct-current offset can be finally reduced, thereby improving bandwidth utilization.

According to a third aspect, the present invention provides a communications system, including the signal processing apparatus according to any one of the first aspect or the possible implementations of the first aspect, or the optical line terminal according to the second aspect.

The communications system adjusts a direct-current offset in the interval time of the data burst block in the input signal, and may complete the adjustment of the direct-current offset within the interval time, instead of starting to adjust the direct current offset only when the signal carries data, so that the direct-current offset can be adjusted in advance, and a time for adjusting the direct-current offset can be finally reduced, thereby improving bandwidth utilization.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
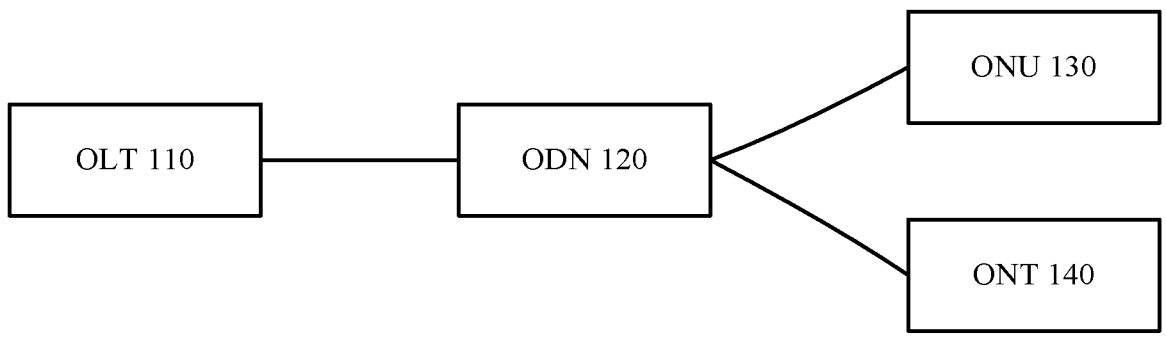
FIG. 1 is a schematic architectural diagram of an application scenario according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

For ease of understanding, a diagram of an example of a PON system architecture to which a signal processing method, a signal processing apparatus, and an optical line terminal in the embodiments of the present invention can be applied is overall described first. It should be understood that the embodiments of the present invention are not limited to a system architecture shown in FIG. 1. In addition, an apparatus in FIG. 1 may be hardware, or software obtained through functional division, or a combination thereof.

A PON system mainly includes an OLT 110 of a central office, an optical distribution network (ODN) 120 including a passive optical device, and an optical network unit (ONU) 130 of a client, or an optical network terminal (ONT) 140.

The OLT 110 is mainly configured to connect to a terminal device of a backbone optical fiber, and specifically, may be configured to: send Ethernet data to the ONU in a broadcast manner, initiate and control a ranging process, record ranging information, allocate a bandwidth to the ONU (to be specific, control a start time for sending data by the ONU and a transmit window size), or the like, or may receive data sent by the ONU.

The ODN 120 is a PON-based fiber to the home (FTTH) optical cable network, and mainly provides an optical transmission path between the OLT and the ONU.

The ONU 130 is divided into an active optical network unit and a passive optical network unit, and is also usually referred to as an optical node. Usually, a device equipped with an optical receiver, an uplink optical transmitter, and a plurality of bridger amplifier network monitors is referred to as an optical node. The ONU is mainly configured to: choose to receive the broadcast data sent by the OLT, respond to ranging and power control commands sent by the OLT, make a corresponding adjustment, buffer Ethernet data of a user, and send data in a transmit window allocated by the OLT to an uplink direction, for example, to the OLT.

Usually, the ONT is the ONU, an optical network device for the client. Strictly, the ONT should be a part of the ONU. A difference between the ONT and the ONU lies in that the ONT is an optical network terminal and directly located on the client, but the ONU is an optical network unit, and there may be another network, such as the Ethernet, between the ONU and the user.

As an uplink rate continuously increases, additional uplink overheads are caused if a burst settling time of an LA in the OLT is extremely long, and consequently, bandwidth utilization is reduced. To reduce the overheads and improve the bandwidth utilization, the burst settling time of the LA in the OTL may be reduced as much as possible.

The burst settling time of the LA is a response time required by the LA for measuring and compensating for a direct-current offset (DC-offset) of the LA to ensure that each burst block signal is correctly amplified when a data stream of a link is in a burst state. For a limiting amplifier that is responsible for signal reshaping inside a receiver, a DC-offset inside an amplification circuit of the limiting amplifier causes distortion of an output signal, and if the DC-offset is not measured and compensated, the DC-offset greatly affects sensitivity of the receiver.

Therefore, the embodiments of the present invention provide a signal processing method, a signal processing apparatus, an OLT, and a communications system, to greatly reduce a burst settling time of an LA in the OTL, thereby reducing overheads of an uplink and improving bandwidth utilization.

Figure 2:
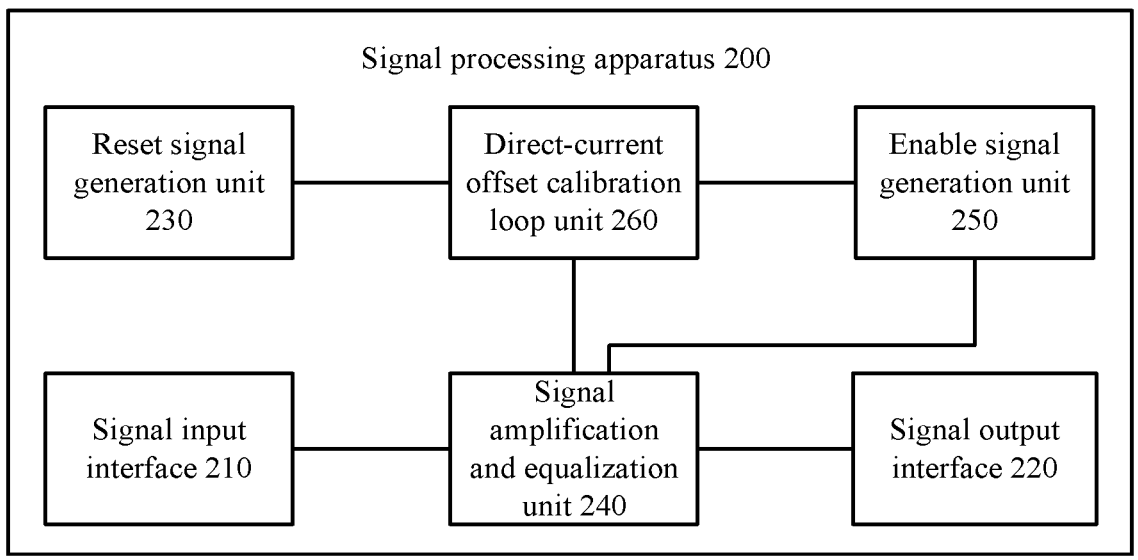
FIG. 2 is a schematic structural diagram of a signal processing apparatus according to an embodiment of the present invention.

FIG. 2 is a schematic structural diagram of a signal processing apparatus 200 according to an embodiment of the present invention. It should be understood that the signal processing apparatus shown in FIG. 2 is only an example. The signal processing apparatus in this embodiment of the present invention may alternatively include another module or unit, or include modules having functions similar to those of modules in FIG. 2, or not necessarily include all modules in FIG. 2.

The signal processing apparatus 200 includes a signal input interface 210, a signal output interface 220, a reset signal generation unit 230, a signal amplification and equalization unit 240, an enable signal generation unit 250, and N direct-current offset calibration loop units 260. N is a positive integer.

The signal input interface 210 is connected to the signal amplification and equalization unit 240, the signal amplification and equalization unit 240 is connected to the signal output interface 220 and the enable signal generation unit 250, the enable signal generation unit 250 is connected to the N direct-current offset calibration loop units 260, the N direct-current offset calibration loop units 260 are connected to the signal amplification and equalization unit 240, and the reset signal generation unit 230 is connected to the N direct-current offset calibration loop units 260.

The signal input interface 210 is configured to receive a first signal. The reset signal generation unit 230 is configured to output a reset signal to the N direct-current offset calibration loop units 260 when an interval time of a data burst block occurs in the first signal. The signal amplification and equalization unit 240 is configured to: adjust, based on a second signal output by the N direct-current offset calibration loop units 260, the first signal received from the signal input interface 210, and amplify and equalize the first signal. The enable signal generation unit 250 is configured to output an enable signal to the N direct-current offset calibration loop units 260 when detecting that a bias voltage corresponding to the signal output by the signal amplification unit inverses. The N direct-current offset calibration loop units 260 are configured to: perform resetting when receiving the reset signal output by the reset signal generation unit 230, and when receiving the enable signal output by the enable signal generation unit 250, start to output the second signal to the signal amplification and equalization unit 240 based on a clock signal. The clock signal may be provided by an external clock data recovery (CDR) circuit, or an internal crystal oscillator.

In this embodiment of the present invention, the interval time of the data burst block may be a guard period (GP) time between data burst blocks, or may be a time period that may be used for adjusting a direct-current offset and that is determined by a Media Access Control (MAC) chip based on a requirement. No data is transmitted by the first signal within the time period. The data burst block may be a data block sent by an ONU to an OLT.

If the signal processing apparatus 200 cannot complete the adjustment of the direct-current offset within the guard period time when the guard period time between data burst blocks is relatively short, the MAC chip may send an instruction to another device (such as the ONU), apparatus, or unit, to instruct the another device (such as the ONU), apparatus, or unit to temporarily stop transmitting data to the signal processing apparatus 200, until the signal processing apparatus 200 completes the adjustment of the direct-current offset on the signal used for transmitting data. In this case, the period of temporarily stopping sending data according to the instruction of the MAC chip may also be referred to as the interval time of the burst block.

It should be understood that a connection relationship between the units in the signal processing apparatus 200 in FIG. 2 is only an example for better describing the signal processing apparatus and a signal processing method in this embodiment of the present invention, and should not constitute any limitation on the present invention.

When the signal processing apparatus shown in FIG. 2 is used to process a signal, a specific signal processing method is as follows:

S310. The signal input interface 210 receives a first signal.

S320. The reset signal generation unit 230 outputs a reset signal to the N direct-current offset calibration loop units 260 when an interval time of a data burst block occurs in the first signal.

The reset signal generation unit outputs the reset signal to the N direct-current offset calibration loop units when the interval time of the data burst block occurs in the signal for carrying data, so that the N direct-current offset calibration loop units are reset to an initial state, and the N direct-current offset calibration loop units can restart, when the interval time of the data burst block occurs in the signal, to calculate a current adjustment amount required for adjusting the direct-current offset in the first signal.

S330. Each of the N direct-current offset calibration loop units is reset when receiving the reset signal output by the reset signal generation unit 230.

Each of the N direct-current offset calibration loop units is reset when receiving the reset signal output by the reset signal generation unit 230, and prepares to restart, when receiving an enable signal output by the enable signal generation unit, to calculate the current adjustment amount required for adjusting the direct-current offset in the first signal.

S340. The signal amplification and equalization unit 240 adjusts, based on a second signal output by the N direct-current offset calibration loop units, the first signal received from the signal input interface 210, and amplifies and equalizes the first signal.

After the signal input interface 210 receives the first signal, the signal amplification and equalization unit connected to the signal input interface not only receives the first signal from the signal input interface but also receives a direct-current current adjustment amount (for ease of subsequent descriptions, the current adjustment amount is referred to as the second signal) output by some or all of the N direct-current offset calibration loop units. In this case, the signal amplification and equalization unit adjusts the first signal based on the second signal, and amplifies and equalizes a signal obtained after the adjustment.

S350. The enable signal generation unit 250 detects a differential voltage signal output by the signal amplification and equalization unit, and outputs an enable signal to the N direct-current offset calibration loop units based on the differential voltage signal.

The enable signal generation unit 250 detects the signal processed and output by the signal amplification and equalization unit 240. Specifically, when detecting that the signal amplification and equalization unit outputs the differential voltage signal, the enable signal generation unit outputs the enable signal to one of the N direct-current offset calibration loop units, so that the direct-current offset calibration loop unit starts to calculate the current adjustment amount, namely, the second signal, based on a clock signal.

The enable signal generation unit continues to detect the differential voltage signal output by the amplification and equalization unit. When detecting that the differential voltage signal output by the signal amplification and equalization unit inverses for the first time, the enable signal generation unit outputs the enable signal to another direct-current offset calibration loop unit of the N direct-current offset calibration loop units, so that the direct-current offset calibration loop unit starts to calculate the circuit adjustment amount, namely, the second signal, based on the clock signal. The enable signal generation unit continuously repeats the step, and each time the enable signal generation unit detects that the differential voltage signal output by the signal amplification and equalization unit inverses, the enable signal generation unit sequentially outputs the enable signal to a direct-current offset calibration loop unit, to which the enable signal has not been output, of the N direct-current offset calibration loop units, so that the direct-current offset calibration loop unit starts to calculate the circuit adjustment amount, namely, the second signal, based on the clock signal, until all the N direct-current offset calibration loop units have calculated the second signal and output the second signal to the signal amplification and equalization unit, so that the signal amplification and equalization unit adjusts the first signal based on the second signal.

It should be noted that when outputting the enable signal to a direct-current offset calibration loop unit, the enable signal generation unit stops outputting the enable signal to another direct-current offset calibration loop unit.

S360. When receiving the enable signal output by the enable signal generation unit 250, each of the N direct-current offset calibration loop units starts to output the second signal to the signal amplification and equalization unit 240 based on a clock signal.

When the enable signal generation unit stops outputting the enable signal to all the N direct-current offset calibration loop units, each of the N direct-current offset calibration loop units outputs a stable current adjustment amount to the signal amplification and equalization unit, so that an adjustment of a signal received by the signal input interface is completed, and a signal on which a direct-current offset adjustment has been performed is output from a signal output port.

Compared with the prior art, the signal processing apparatus and the signal processing method in this embodiment of the present invention start to adjust a direct-current offset in the interval time of the data burst block in the input signal, and may complete the adjustment of the direct-current offset within the interval time, instead of starting to adjust the direct current offset only when the signal carries data, so that the direct-current offset can be adjusted in advance, and a time for adjusting the direct-current offset can be finally reduced, thereby improving bandwidth utilization.

In this embodiment of the present invention, optionally, the enable signal generation unit may further be configured to output the clock signal to the N direct-current offset calibration loop units based on the enable signal. Specifically, the enable signal generation unit outputs the enable signal to a direct-current offset calibration loop unit, so that when the direct-current offset calibration loop unit starts to calculate the adjustment amount of the direct current offset, the enable signal generation unit may further output the clock signal to the direct-current offset calibration loop unit based on the enable signal.

In this embodiment of the present invention, optionally, the reset signal generation unit may further be configured to detect the interval time of the data burst block in the first signal. Specifically, the reset signal generation unit detects the interval time of the data burst block in the first signal, and outputs the reset signal to all the direct-current offset calibration loop units when detecting the interval time.

Certainly, optionally, the reset signal generation unit may receive control signaling sent by an apparatus in the interval time of the data burst block that occurs in the first signal received by the signal input interface, and output the reset signal to all the direct-current offset calibration loop units based on the control signaling, where the apparatus, such as a MAC chip, can learn of the interval time of the data burst block in the first signal received by the signal input interface.

In this embodiment of the present invention, when the reset signal generation unit may further be configured to detect the interval time of the data burst block in the first signal, specifically, the reset signal generation unit may include a signal detector and a reset signal generator that are sequentially connected.

The signal detector is configured to output an indication signal to the reset signal generator when detecting that an interval time occurs in the data burst block in the first signal; and the reset signal generator is configured to output the reset signal to the N direct-current offset calibration loop units when receiving the indication signal output by the signal detector.

In this case, in the corresponding signal processing method, a specific implementation in which the reset signal generation unit 230 outputs the reset signal to the N direct-current offset calibration loop units when the interval time of the data burst block occurs in the first signal may be: outputting, by the signal detector, an indication signal to the reset signal generator when detecting that the interval time occurs in the data burst block in the first signal; and outputting, by the reset signal generator, the reset signal to the N direct-current offset calibration loop units when receiving the indication signal output by the signal detector.

In this embodiment of the present invention, optionally, the signal amplification and equalization unit may include N signal adders, at least one LA, M continuous time linear equalizers (CTLE), and K LFEQs. M and K are both positive integers.

The N direct-current offset calibration loop units are one-to-one connected to the N signal adders. The N signal adders, the at least one LA, the M CTLEs, and the K LFEQs in the signal amplification and equalization unit may be interleaved, to ensure that the input signal is properly equalized and limiting-amplified. For example, one or more LAs may be connected before and behind each signal adder, each CTLE, and each LFEQ. The connection relationship between the modules in the signal amplification and equalization unit is not limited in this embodiment of the present invention.

Each signal adder is configured to add the first signal and the second signal that are input into the signal adder, to be specific, configured to adjust the first signal in the signal and equalization unit based on the second signal output by a direct-current offset calibration loop unit connected to the signal adder. The at least one LA is configured to amplify a signal obtained after the signal adder adjusts the first signal based on the second signal in the amplification and equalization unit. The at least one CTLE and the at least one LFEQ are configured to equalize a signal obtained after the amplification in the amplification and equalization unit.

In this case, in the corresponding signal processing method, each signal adder adds the second signal output by the direct-current offset calibration loop unit connected to the signal adder and the first signal input into the amplification and equalization unit. It should be noted that the addition described herein is a vector addition, specifically indicating that the second signal is used to adjust magnitude of the first signal, in other words, a direct-current offset adjustment is performed. The LA in the signal amplification and equalization unit amplifies the signal in the amplification and equalization unit, and the CTLE and the LFEQ equalize the signal in the amplification and equalization unit. The CTLE is configured to compensate for high frequency fading of the input signal of the amplification and equalization unit. The LFEQ is configured to correct a low frequency location response. The CTLE cooperates with the LFEQ, to ensure equalization of the signal output by the amplification and equalization unit.

In this embodiment of the present invention, optionally, each of the N direct-current offset calibration loop units includes a counter, a digital-to-analog converter (DAC), and a voltage controlled mirror current source sequentially connected to each other. Each counter is configured to zero out when receiving the reset signal, and each DAC is configured to output a reference voltage minimum value when receiving the reset signal.

Each DAC has a corresponding reference voltage range, and each DAC outputs a minimum value in the reference voltage range when receiving the reset signal output by the reset signal generator. As counting results of the counter are added, the voltage output by the DAC increases accordingly.

It should be noted that each voltage controlled mirror current source has two input interfaces, one input interface is configured to receive an input voltage, and one input interface is configured to receive a mirror voltage. The two input interfaces of each voltage controlled mirror current source are respectively configured to receive a voltage output by the DAC connected to the voltage controlled mirror current source and a reference voltage medium value of the DAC connected to the voltage controlled mirror current source. The reference circuit medium value of the DAC is a medium value of a maximum value and a minimum value in the reference voltage range of the DAC.

A connection manner of two input interfaces in circuit controlled mirror current sources in two adjacent direct-current offset calibration loop units and the output voltage of the DAC is opposite to that of the two input interfaces in the circuit controlled mirror current sources in the two adjacent direct-current offset calibration loop units and the reference voltage medium value of the DAC. For example, an input interface that is of a voltage controlled mirror current source of a first direct-current offset calibration loop unit and that is configured to receive an input voltage is connected to an output interface of the DAC, and configured to receive a voltage output by the DAC based on a counting result of the counter, and an input interface that is of the voltage controlled mirror current source and that is configured to receive a mirror voltage is configured to receive the reference voltage medium value of the DAC. An input interface that is of a voltage controlled mirror current source of a second direct-current offset calibration loop unit and that is configured to receive an input voltage is specifically configured to receive the reference voltage medium value of the DAC, and an input interface that is of the voltage controlled mirror current source and that is configured to receive a mirror voltage is configured to receive a voltage output by the DAC based on a counting result of the counter.

In this embodiment of the present invention, optionally, the enable signal generation unit includes a voltage detector, an enable signal generator, and a clock controller. The voltage detector is configured to detect the differential voltage corresponding to the signal output by the amplification unit; the enable signal generator is configured to output the enable signal to the N direct-current offset calibration loop units based on the differential voltage detected by the voltage detector; the clock controller is configured to: process an original clock signal based on the enable signal output by the enable signal generator, and output the processed clock signal to the N direct-current offset calibration loop units; each direct-current offset calibration loop unit is further configured to: when receiving the enable signal output by the enable signal generation unit, output the second signal based on the clock signal output by the clock controller; each DAC is further configured to output a voltage based on a counting result output by a corresponding counter; each voltage controlled mirror current source is configured to output the second signal based on a voltage output by a corresponding DAC and a reference voltage medium value of the corresponding DAC; and the clock controller is further configured to: when the voltage detector detects that a bias voltage inverses for an $(N+1)^{th}$ time, stop, based on the enable signal output by the enable signal generator, outputting the clock signal to the N counters.

In this case, the corresponding signal processing method is as follows: When the interval time between data burst blocks occurs in the first signal input into the signal processing apparatus, the reset signal generation unit sends the reset signal to all the direct-current offset calibration loop units. Each direct-current offset calibration loop unit performs resetting after receiving the reset signal output by the reset signal generation unit, and specifically, the counter may zero out and the DAC may output a reference voltage minimum value. After the first signal is processed by modules in the amplification and equalization unit, the enable signal generation unit detects a signal output by the amplification and equalization unit. After the direct-current offset calibration loop unit performs resetting, when the voltage detector in the enable signal generation unit detects that the signal output by the signal amplification and equalization unit has a differential voltage, the enable signal generator outputs an enable signal to one of the N direct-current offset calibration loop units (for example, the counter in the direct-current offset calibration loop unit), so that the counter can start to count based on a clock signal.

A specific implementation may be as follows: The clock controller in the enable signal generation unit outputs the clock signal to the counter based on the enable signal, so that the counter starts to count based on the clock signal and the enable signal, and outputs a counting result to the DAC. Then, the DAC outputs a voltage to the voltage controlled mirror current source based on the counting result output by the counter. The voltage controlled mirror current source outputs a signal to the signal adder based on the voltage output by the DAC and the reference voltage medium value of the DAC. The signal adder adjusts a signal in the signal amplification and equalization unit based on the signal. Other modules in the signal amplification and equalization unit amplify and equalize the adjusted signal.

When the voltage detector of the enable signal generator detects that a differential voltage corresponding to the signal output by the signal amplification and equalization unit inverses, the enable signal generator outputs an enable signal to a counter of another direct-current offset calibration loop unit, so that the counter starts to count, the DAC can output a voltage, and further, the voltage controlled mirror current source can output an adjustment signal, thereby finally adjusting the signal in the amplification and equalization unit. The enable signal generator continuously performs the step, to be specific, each time the voltage detector detects that the differential voltage corresponding to the signal output by the signal amplification and equalization unit inverses, the enable signal generator outputs an enable signal to another direct-current offset calibration loop unit of the N direct-current offset calibration loop units, so that the direct-current offset calibration loop unit can output, based on the enable signal, a current adjustment signal for adjusting the signal in the amplification and equalization unit. When the voltage detector detects, for an $N^{th}$ time, that the differential voltage corresponding to the signal output by the signal amplification and equalization unit inverses, the enable signal generator stops outputting the enable signal to all the direct-current offset calibration loop units, in other words, signals output by all the direct-current offset calibration loop unit remain unchanged, to be specific, circuit signals output by the signal amplification and equalization unit and the signal output interface have been adjusted. This finally indicates that signals in the entire signal processing apparatus are adjusted, and burst block data can be transmitted.

Optionally, in this embodiment of the present invention, N and M may be 2, and K may be 1. Two CTLEs, one LFEQ, and a plurality of LAs are sequentially interleaved. A first direct-current offset calibration loop unit of the N direct-current offset calibration loop units is connected to a first signal adder. A DAC in the first direct-current offset calibration loop unit of the N direct-current offset calibration loop units is connected to a first input port of two input ports in a voltage controlled mirror current source in the first direct-current offset calibration loop unit, and a DAC in a second direct-current offset calibration loop unit of the N direct-current offset calibration loop units is connected to a second input port of two input ports in a voltage controlled mirror current source in the second direct-current offset calibration loop unit. The clock controller includes an AND gate and an OR gate. The enable signal generator is connected to the AND gate, and the AND gate is configured to perform an AND logical operation on the enable signal output by the enable signal generator. The AND gate is connected to the OR gate, and the OR gate is configured to perform an OR logical operation on a signal output by the AND gate and the original clock signal, to obtain the clock signal. The OR gate is connected to the N counters.

Figure 3:
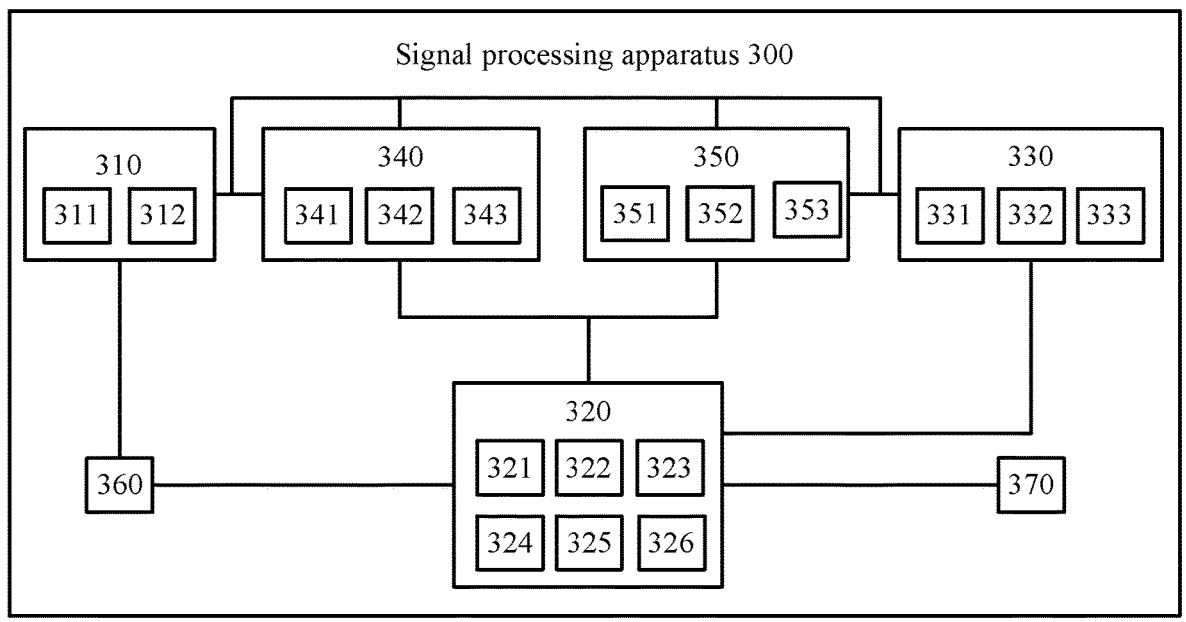
FIG. 3 is a schematic structural diagram of a signal processing apparatus according to an embodiment of the present invention.

FIG. 3 is a schematic structural diagram of a signal processing apparatus 300 according to an embodiment of the present invention. It should be understood that the signal processing apparatus 300 shown in FIG. 3 is only an example. The signal processing apparatus in this embodiment of the present invention may alternatively include another module or unit, or include modules having functions similar to those of modules in FIG. 3, or not necessarily include all modules in FIG. 3.

As shown in FIG. 3, a reset signal generation unit 310 includes a signal detector 311 and a reset signal generator 312. A signal amplification and equalization unit 320 includes a CTLE 321, a CTLE 322, an LFEQ 323, a plurality of limiting amplification units 324, a signal adder 325, and a signal adder 326. An enable signal generation unit 330 includes a voltage detector 331, an enable signal generator 332, and a clock controller 333. The clock controller includes an AND gate and an OR gate.

A first-level direct-current offset calibration loop unit 340 includes a counter 341, a DAC 342, and a voltage controlled mirror current source 343. The counter 341 includes: a clock input port, configured to receive a clock signal sent by the enable signal generation unit, a reset signal input port, configured to receive a reset signal sent by the reset signal generation unit, and an enable signal input port, configured to receive an enable signal sent by the enable signal generation unit.

A second-level direct-current offset calibration loop unit 350 includes a counter 351, a DAC 352, and a voltage controlled mirror current source 353. The counter 351 includes: a clock input port, configured to receive a clock signal sent by the enable signal generation unit, a reset signal input port, configured to receive a reset signal sent by the reset signal generation unit, and an enable signal input port, configured to receive an enable signal sent by the enable signal generation unit.

It should be noted that, a connection manner of an output voltage and a reference voltage medium value of the DAC 352 in the direct-current offset calibration loop unit 350 and the voltage controlled mirror current source 353 is opposite to a connection manner of an output voltage and a reference voltage medium value of the DAC 342 in the direct-current offset calibration loop unit 340 and the voltage controlled mirror current source 343.

When the signal processing apparatus 300 is initially powered on or a burst block guard period occurs in a first signal input at a signal input interface 360 of the signal processing apparatus 300, the reset signal generation unit 310 sends the reset signal to the counters 341 and 351 in the direct-current offset calibration loop units 340 and 350.

The counters 341 and 351 zero out, the DACs 342 and 352 are reset and output reference voltage minimum values. The output voltage of the DAC 341 and the reference voltage medium value of the DAC 341 are respectively used as an input voltage and a mirror voltage of the voltage controlled mirror current source 343.

The voltage detector 331 of the enable signal generator 330 detects a differential voltage signal output by the signal amplification and equalization unit 320. The enable signal generator 332 outputs an enable signal 1 to the AND gate and the counter 341 of the clock controller 333. In this case, the enable signal generator 332 does not output any enable signal to the AND gate and the counter 351. To be specific, an enable signal 2 remains off. Specifically, a level output of the enable signal 1 is 1, and a level output of the enable signal 2 is 0. An AND gate signal outputs a logical level of 0, and the AND gate signal and an original clock signal enter the OR gate of the clock controller 333 together. The OR gate outputs a clock signal to the counters 341 and 351.

The counter 341 receives the enable signal 1 for starting, and operates step by step based on the clock signal output by the OR gate. The DAC 342 in the direct-current offset calibration loop unit 340 converts an accumulative digital signal output by the counter 341 into an analog signal and outputs the analog signal to the voltage controlled mirror current source 343, as the input voltage of the voltage controlled mirror current source 343. The reference voltage medium value of the DAC 342 is also input into the voltage controlled mirror current source 343, as the mirror voltage output to the voltage controlled mirror current source 343. The voltage controlled mirror current source 343 mirrors the signal output by the DAC 342 into a signal, and loads the signal to the signal adder 325 at a front end of the amplification and equalization unit, so that a direct-current offset coarse calibration compensation cycle ends.

The voltage detector 331 of the enable signal generator 330 continuously monitors a differential voltage output by the signal amplification and equalization unit 320. When the differential voltage inverses for the first time, the enable signal generator 332 stops outputting the enable signal 1, but outputs the enable signal 2. To be specific, the level output of the enable signal 1 is 0, and the level output of the enable signal 2 is 1. The AND gate signal outputs the logical level of 0, and the AND gate signal and the clock signal enter the OR gate together. The OR gate outputs the clock signal to the counters 341 and 351. After receiving the enable signal 1, the counter 351 stops counting, a current output by the direct-current offset calibration loop unit 340 remains constant, and the coarse calibration ends.

The counter 351 starts after receiving the enable signal 2, and operates step by step based on the clock signal output by the OR gate. The DAC 352 in the direct-current offset calibration loop unit 350 converts an accumulative digital signal of the counter into an analog signal and outputs the analog signal to the voltage controlled mirror current source 343, as the mirror voltage of the voltage controlled mirror current source 343. The reference voltage medium value of the DAC 352 is also input into the voltage controlled mirror current source 353, as the input voltage output to the voltage controlled mirror current source 353. The voltage controlled mirror current source 353 mirrors the analog signal output by the DAC 352 into a signal, and loads the signal to the signal adder 326 at a rear end of the signal amplification and equalization unit 320, so that a direct-current offset fine calibration compensation cycle ends.

The voltage detector 331 of the enable signal generator 330 continuously monitors the differential voltage signal output by the signal amplification and equalization unit 320. When the differential voltage inverses for the second time, the enable signal generator stops outputting the enable signal 2. To be specific, the level output of the enable signal 1 is 0, and the level output of the enable signal 2 is also 0. The counter 352 stops counting, the current output by the direct-current offset calibration loop unit 350 remains constant, the fine calibration ends, and the signal output interface 370 outputs a constant current. In other words, the signal processing apparatus 300 can normally receive input data and equalize and amplify a signal.

Alternatively, the voltage detector 331 of the enable signal generator 330 continuously monitors the differential voltage signal output by the signal amplification and equalization unit 320. When the differential voltage inverses for the second time, a level of the enable signal 1 output by the enable signal generator may be 1, and a level of the enable signal 2 output by the enable signal generator may also be 1. In this case, although the counter 351 and the counter 352 may further receive an enable signal of an enable count, an output high level of 1 is input into the OR gate in the clock controller 333 after two high levels of 1 are simultaneously input into the AND gate in the clock controller 333, and after an OR logical operation is performed on the high level of 1 input into the OR gate and the original clock signal input into the OR gate, the OR gate outputs the high level of 1 but not the original clock signal, in other words, the output of the OR gate to the counter 351 and the counter 352 is no longer the original clock signal. Therefore, the counter 351 and the counter 352 also stop counting, the current output by the direct-current offset calibration loop unit 350 remains constant, the fine calibration ends, and the signal output interface 370 outputs a constant current. In other words, the signal processing apparatus 300 can normally receive input data and equalize and amplify a signal.

Figure 4:
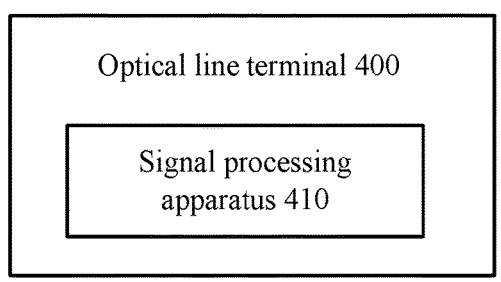
FIG. 4 is a schematic structural diagram of an optical line terminal according to an embodiment of the present invention.

An embodiment of the present invention further provides an optical line terminal, and a schematic structural diagram of the optical line terminal is shown in FIG. 4. The optical line terminal 400 shown in FIG. 4 includes a signal processing apparatus 410. The signal processing apparatus 410 may be the signal processing apparatus 200 shown in FIG. 2, or may be the signal processing apparatus 300 shown in FIG. 3. For brevity, details are not described herein again.

It should be understood that the optical line terminal shown in FIG. 4 is only an example. The optical line terminal in this embodiment of the present invention may alternatively include another module or unit, such as a MAC chip, or include modules having functions similar to those of modules in FIG. 4, or not necessarily include all modules in FIG. 2 or FIG. 3.

In addition, an embodiment of the present invention further provides a communications system. The communications system may include the signal processing apparatus 200 shown in FIG. 2, the signal processing apparatus 300 shown in FIG. 3, or the optical line terminal 400 shown in FIG. 4. For brevity, details are not described herein again.

It should be understood that the communications system may alternatively include other devices, apparatuses, or units, for example, the ONU shown in FIG. 1, or devices or modules having functions similar to those of the devices in FIG. 1.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A signal processing apparatus, comprising: a signal input interface, a signal output interface, a reset signal generator, a signal amplification and equalization circuit, an enable signal generator, and N direct-current offset calibration loop circuits, wherein N is a positive integer;
   wherein the signal input interface is connected to the signal amplification and equalization circuit, the signal amplification and equalization circuit is connected to the signal output interface and the enable signal generator, the enable signal generator is connected to the N direct-current offset calibration loop circuits, the N direct-current offset calibration loop circuits are connected to the signal amplification and equalization circuit, and the reset signal generator is connected to the N direct-current offset calibration loop circuits;
   the signal input interface is configured to receive a first signal;
   the reset signal generator is configured to output a reset signal to the N direct-current offset calibration loop circuits when an interval time occurs in a data burst block occurs in the first signal;
   the signal amplification and equalization circuit is configured to: adjust, based on a second signal output by the N direct-current offset calibration loop circuits, the first signal received from the signal input interface, and amplify and equalize the first signal;
   the enable signal generator is configured to: detect a differential voltage corresponding to a signal output by the signal amplification and equalization circuit, and output an enable signal to the N direct-current offset calibration loop circuits based on the differential voltage;
   the N direct-current offset calibration loop circuits are configured to: perform resetting when receiving the reset signal output by the reset signal generator, and when receiving the enable signal output by the enable signal generator, start to output the second signal to the signal amplification and equalization circuit based on a clock signal; and
   the signal output interface is configured to output the output signal adjusted, amplified, and equalized by the signal amplification and equalization circuit.

2. The signal processing apparatus according to claim 1, wherein the enable signal generator is further configured to output the clock signal to the N direct-current offset calibration loop circuits based on the enable signal.

3. The signal processing apparatus according to claim 1, wherein the reset signal generator comprises a signal detector and a further reset signal generator that are sequentially connected, wherein
   the signal detector is configured to output an indication signal to the further reset signal generator when detecting that an interval time occurs in the data burst block in the first signal; and
   the further reset signal generator is configured to output the reset signal to the N direct-current offset calibration loop circuits when receiving the indication signal output by the signal detector.

4. The signal processing apparatus according to claim 3, wherein the signal amplification and equalization circuit comprises N signal adders, at least one limiting amplifier (LA), M continuous time linear equalizers (CTLEs), and K low frequency equalizers (LFEQs), wherein M and K are positive integers;
   each signal adder is configured to add the first signal and the second signal;

the at least one LA is configured to amplify a signal in the amplification and equalization circuit; and the at least one CTLE and the at least one LFEQ are configured to equalize the signal in the amplification and equalization circuit.

5. The signal processing apparatus according to claim 3, wherein each of the N direct-current offset calibration loop circuits comprises a counter, a digital-to-analog converter (DAC), and a voltage controlled mirror current source sequentially connected to each other, wherein each counter is configured to zero out when receiving the reset signal, and each DAC is configured to output a reference voltage minimum value when receiving the reset signal.

6. The signal processing apparatus according to claim 4, wherein each of the N direct-current offset calibration loop circuits comprises a counter, a digital-to-analog converter (DAC), and a voltage controlled mirror current source sequentially connected to each other, wherein each counter is configured to zero out when receiving the reset signal, and each DAC is configured to output a reference voltage minimum value when receiving the reset signal.

7. The signal processing apparatus according to claim 3, wherein the enable signal generator comprises a voltage detector, further enable signal generator, and a clock controller, wherein the voltage detector is configured to detect the differential voltage corresponding to the signal output by the signal amplification and equalization circuit;

the further enable signal generator is configured to output the enable signal to the N direct-current offset calibration loop circuits based on the differential voltage detected by the voltage detector;

the clock controller is configured to: process an original clock signal based on the enable signal output by the further enable signal generator, and output the processed clock signal to the N direct-current offset calibration loop circuits;

each direct-current offset calibration loop circuit is further configured to: when receiving the enable signal output by the enable signal generator, output the second signal based on the clock signal output by the clock controller;

each DAC is further configured to output a voltage based on a counting result output by a corresponding counter;

each voltage controlled mirror current source is configured to output the second signal based on a voltage output by a corresponding DAC and a reference voltage medium value of the corresponding DAC; and the clock controller is further configured to: when the voltage detector detects that a bias voltage inverses for an $(N+1)^{th}$ time, stop, based on the enable signal output by the further enable signal generator, outputting the clock signal to the N counters.

8. The signal processing apparatus according to claim 4, wherein the enable signal generator comprises a voltage detector, further enable signal generator, and a clock controller, wherein the voltage detector is configured to detect the differential voltage corresponding to the signal output by the signal amplification circuit;

the further enable signal generator is configured to output the enable signal to the N direct-current offset calibration loop circuits based on the differential voltage detected by the voltage detector;

the clock controller is configured to: process an original clock signal based on the enable signal output by the further enable signal generator, and output the processed clock signal to the N direct-current offset calibration loop circuits;

each direct-current offset calibration loop circuit is further configured to: when receiving the enable signal output by the enable signal generator, output the second signal based on the clock signal output by the clock controller;

each DAC is further configured to output a voltage based on a counting result output by a corresponding counter;

each voltage controlled mirror current source is configured to output the second signal based on a voltage output by a corresponding DAC and a reference voltage medium value of the corresponding DAC; and the clock controller is further configured to: when the voltage detector detects that a bias voltage inverses for an $(N+1)^{th}$ time, stop, based on the enable signal output by the further enable signal generator, outputting the clock signal to the N counters.

9. The signal processing apparatus according to claim 5, wherein the enable signal generator comprises a voltage detector, further enable signal generator, and a clock controller, wherein the voltage detector is configured to detect the differential voltage corresponding to the signal output by the signal amplification circuit;

the further enable signal generator is configured to output the enable signal to the N direct-current offset calibration loop circuits based on the differential voltage detected by the voltage detector;

the clock controller is configured to: process an original clock signal based on the enable signal output by the further enable signal generator, and output the processed clock signal to the N direct-current offset calibration loop circuits;

each direct-current offset calibration loop circuit is further configured to: when receiving the enable signal output by the enable signal generator, output the second signal based on the clock signal output by the clock controller;

each DAC is further configured to output a voltage based on a counting result output by a corresponding counter;

each voltage controlled mirror current source is configured to output the second signal based on a voltage output by a corresponding DAC and a reference voltage medium value of the corresponding DAC; and the clock controller is further configured to: when the voltage detector detects that a bias voltage inverses for an $(N+1)^{th}$ time, stop, based on the enable signal output by the further enable signal generator, outputting the clock signal to the N counters.

10. The signal processing apparatus according to claim 7, wherein N=2, M=2, and K=1, wherein the M CTLEs, the K LFEQs, and the at least one LA are sequentially interleaved;

a first direct-current offset calibration loop circuit of the N direct-current offset calibration loop circuits is connected to a first signal adder;

a DAC in the first direct-current offset calibration loop circuit of the N direct-current offset calibration loop circuits is connected to a first input port of two input ports in a voltage controlled mirror current source in the first direct-current offset calibration loop circuit, and a DAC in a second direct-current offset calibration loop circuit of the N direct-current offset calibration loop circuits is connected to a second input port of two input ports in a voltage controlled mirror current source in the second direct-current offset calibration loop circuit;

the clock controller comprises an AND gate and an OR gate;
the further enable signal generator is connected to the AND gate, and the AND gate is configured to perform an AND logical operation on the enable signal output by the further enable signal generator;
the AND gate is connected to the OR gate, and the OR gate is configured to perform an OR logical operation on a signal output by the AND gate and the original clock signal, to obtain the clock signal; and
the OR gate is connected to the N counters.

11. An optical line terminal, comprising a signal processing apparatus including: a signal input interface, a signal output interface, a reset signal generator, a signal amplification and equalization circuit, an enable signal generator, and N direct-current offset calibration loop circuits, wherein N is a positive integer;
wherein the signal input interface is connected to the signal amplification and equalization circuit, the signal amplification and equalization circuit is connected to the signal output interface and the enable signal generator, the enable signal generator is connected to the N direct-current offset calibration loop circuits, the N direct-current offset calibration loop circuits are connected to the signal amplification and equalization circuit, and the reset signal generator is connected to the N direct-current offset calibration loop circuits;
the signal input interface is configured to receive a first signal;
the reset signal generator is configured to output a reset signal to the N direct-current offset calibration loop circuits when an interval time occurs in a data burst block occurs in the first signal;
the signal amplification and equalization circuit is configured to: adjust, based on a second signal output by the N direct-current offset calibration loop circuits, the first signal received from the signal input interface, and amplify and equalize the first signal;
the enable signal generator is configured to: detect a differential voltage corresponding to a signal output by the signal amplification and equalization circuit, and output an enable signal to the N direct-current offset calibration loop circuits based on the differential voltage;
the N direct-current offset calibration loop circuits are configured to: perform resetting when receiving the reset signal output by the reset signal generator, and when receiving the enable signal output by the enable signal generator, start to output the second signal to the signal amplification and equalization circuit based on a clock signal; and
the signal output interface is configured to output the output signal adjusted, amplified, and equalized by the signal amplification and equalization circuit.

12. A communications system, comprising a signal processing apparatus including: a signal input interface, a signal output interface, a reset signal generator, a signal amplification and equalization circuit, an enable signal generator, and N direct-current offset calibration loop circuits, wherein N is a positive integer;
wherein the signal input interface is connected to the signal amplification and equalization circuit, the signal amplification and equalization circuit is connected to the signal output interface and the enable signal generator, the enable signal generator is connected to the N direct-current offset calibration loop circuits, the N direct-current offset calibration loop circuits are connected to the signal amplification and equalization circuit, and the reset signal generator is connected to the N direct-current offset calibration loop circuits;
the signal input interface is configured to receive a first signal;
the reset signal generator is configured to output a reset signal to the N direct-current offset calibration loop circuits when an interval time occurs in a data burst block occurs in the first signal;
the signal amplification and equalization circuit is configured to: adjust, based on a second signal output by the N direct-current offset calibration loop circuits, the first signal received from the signal input interface, and amplify and equalize the first signal;
the enable signal generator is configured to: detect a differential voltage corresponding to a signal output by the signal amplification and equalization circuit, and output an enable signal to the N direct-current offset calibration loop circuits based on the differential voltage;
the N direct-current offset calibration loop circuits are configured to: perform resetting when receiving the reset signal output by the reset signal generator, and when receiving the enable signal output by the enable signal generator, start to output the second signal to the signal amplification and equalization circuit based on a clock signal; and
the signal output interface is configured to output the output signal adjusted, amplified, and equalized by the signal amplification and equalization circuit.

13. The optical line terminal according to claim 11, wherein the enable signal generator is further configured to output the clock signal to the N direct-current offset calibration loop circuits based on the enable signal.

14. The optical line terminal according to claim 11, wherein the reset signal generator comprises a signal detector and a further reset signal generator that are sequentially connected, wherein
the signal detector is configured to output an indication signal to the further reset signal generator when detecting that an interval time occurs in the data burst block in the first signal; and
the further reset signal generator is configured to output the reset signal to the N direct-current offset calibration loop circuits when receiving the indication signal output by the signal detector.

15. The optical line terminal according to claim 14, wherein the signal amplification and equalization circuit comprises N signal adders, at least one limiting amplifier (LA), M continuous time linear equalizers (CTLEs), and K low frequency equalizers (LFEQs), wherein M and K are positive integers;
each signal adder is configured to add the first signal and the second signal;
the at least one LA is configured to amplify a signal in the amplification and equalization circuit; and
the at least one CTLE and the at least one LFEQ are configured to equalize the signal in the amplification and equalization circuit.

16. The optical line terminal according to claim 14, wherein each of the N direct-current offset calibration loop circuits comprises a counter, a digital-to-analog converter (DAC), and a voltage controlled mirror current source sequentially connected to each other, wherein each counter is configured to zero out when receiving the reset signal, and each DAC is configured to output a reference voltage minimum value when receiving the reset signal.

17. The communications system according to claim 12, wherein the enable signal generator is further configured to output the clock signal to the N direct-current offset calibration loop circuits based on the enable signal.

18. The communications system according to claim 12, wherein the reset signal generator comprises a signal detector and a further reset signal generator that are sequentially connected, wherein
the signal detector is configured to output an indication signal to the further reset signal generator when detecting that an interval time occurs in the data burst block in the first signal; and
the further reset signal generator is configured to output the reset signal to the N direct-current offset calibration loop circuits when receiving the indication signal output by the signal detector.

19. The communications system according to claim 18, wherein the signal amplification and equalization circuit comprises N signal adders, at least one limiting amplifier (LA), M continuous time linear equalizers (CTLEs), and K low frequency equalizers (LFEQs), wherein M and K are positive integers;
each signal adder is configured to add the first signal and the second signal;
the at least one LA is configured to amplify a signal in the amplification and equalization circuit; and
the at least one CTLE and the at least one LFEQ are configured to equalize the signal in the amplification and equalization circuit.

20. The communications system according to claim 18, wherein each of the N direct-current offset calibration loop circuits comprises a counter, a digital-to-analog converter (DAC), and a voltage controlled mirror current source sequentially connected to each other, wherein
each counter is configured to zero out when receiving the reset signal, and each DAC is configured to output a reference voltage minimum value when receiving the reset signal.

* * * * *